United States Patent
Stettner

(10) Patent No.: US 7,194,511 B2
(45) Date of Patent: Mar. 20, 2007

(54) SYSTEM AND METHOD TO MANAGE PARTICIPANT INPUT FOR AN INTERACTIVE SHOW

(75) Inventor: Armando Paul Stettner, Woodinville, WA (US)

(73) Assignee: Digeo, Inc., Kirkland, WA (US)

(*) Notice: Subject to any disclaimer, the term of this patent is extended or adjusted under 35 U.S.C. 154(b) by 711 days.

(21) Appl. No.: 09/747,168

(22) Filed: Dec. 21, 2000

(65) Prior Publication Data

US 2002/0023130 A1 Feb. 21, 2002

Related U.S. Application Data

(60) Provisional application No. 60/224,736, filed on Aug. 10, 2000.

(51) Int. Cl.
*G06F 15/16* (2006.01)
(52) U.S. Cl. ............... 709/205; 709/206; 379/202.01; 725/13
(58) Field of Classification Search ............. 725/134, 725/24, 87, 13; 463/42, 40; 709/205, 206; 379/93.13, 93.12, 93.25, 202.01
See application file for complete search history.

(56) References Cited

U.S. PATENT DOCUMENTS

| | | | |
|---|---|---|---|
| 5,794,118 A * | 8/1998 | Yoshinobu | 725/134 |
| 5,860,862 A | 1/1999 | Junkin | |
| 5,936,661 A | 8/1999 | Trew | |
| 6,151,387 A * | 11/2000 | Katz | 379/93.13 |
| 6,193,610 B1 * | 2/2001 | Junkin | 463/40 |
| 6,224,486 B1 * | 5/2001 | Walker et al. | 463/42 |
| 6,292,547 B1 * | 9/2001 | Katz | 379/93.12 |
| 6,349,134 B1 * | 2/2002 | Katz | 379/92.01 |
| 6,425,828 B2 * | 7/2002 | Walker et al. | 463/42 |
| 6,676,521 B1 * | 1/2004 | La Mura et al. | 463/42 |
| 6,678,890 B1 * | 1/2004 | Cai | 725/24 |
| 6,683,943 B2 * | 1/2004 | Wuelly | 379/93.13 |
| 6,694,352 B1 * | 2/2004 | Omoigui | 709/205 |
| 6,804,825 B1 * | 10/2004 | White et al. | 725/87 |
| 2002/0048354 A1 * | 4/2002 | Perlman et al. | 379/93.25 |
| 2003/0061566 A1 * | 3/2003 | Rubstein et al. | 715/500.1 |

* cited by examiner

*Primary Examiner*—Jungwon Chang
(74) *Attorney, Agent, or Firm*—Darby & Darby PC; Bruce E. Black

(57) ABSTRACT

Participant input for an interactive show, such as input submitted by the show's viewers or listeners, is managed. The received participant input is stored in a server. Software or other techniques/tools processes the participant input stored in the server to sort, identify, classify, or select submissions that may be appropriate to address during the interactive show or during other times. While the participant input is being processed, the participant who sent the submission need not be kept on hold or otherwise have to keep the line of communication open, and instead, the participant can terminate the communication with the interactive show. An alert can be subsequently sent to the participant if or when the participant's submission is to be addressed in the interactive show.

21 Claims, 3 Drawing Sheets

SYSTEM AND METHOD TO MANAGE PARTICIPANT INPUT FOR AN INTERACTIVE SHOW

CROSS-REFERENCE TO RELATED APPLICATIONS

The present application claims the benefit of U.S. Provisional Patent Application Ser. No. 60/224,736, filed Aug. 10, 2000, entitled "USER INTERFACE TO TELEVISION BROADCASTS AND INTERNET CONTENT," which is incorporated herein by reference.

BACKGROUND OF THE INVENTION

1. Field of the Invention

The present invention generally relates to the broadcast of programs, and in particular but not exclusively, relates to management of participant input for an interactive show, such as an interactive television show or an interactive radio show.

2. Background Information

There are many shows on television and on radio, such as "call-in" shows, that invite viewers or listeners (hereinafter "participants") to submit questions or comments. For a radio program, listeners can dial a telephone number of the radio station and speak live on the air with a radio personality or a guest. Similarly for a television program, a host of the television program can solicit viewers to submit questions or comments related to a topic being discussed in the television program. Many television programs typically receive viewer input via telephone and place the viewer on "speaker phone" during the broadcast.

While these call-in shows claim to be "interactive shows," they are not truly interactive. Often, a participant cannot even connect to the show (due to a large number of inbound callers tying up a telephone line, for example). Therefore, the participant is prevented from interacting with anything. Even if the participant is able to submit a comment/question, the participant may nevertheless be placed on hold on the telephone and wait for a significant amount of time for the host of the show to answer the participant's telephone. This can become a significant resource allocation problem for the show, particularly if many callers call in and are kept on hold—the show's telephone lines are kept tied up and many telephone lines are, therefore, needed to provide adequate service.

Often, call-in shows attempt to keep their telephone lines open by having a person/operator take a participant's question/comment and then terminate the connection, so that another call can be taken. However, disconnection of the participants in this manner removes the interactive nature of the show, since the participant typically is not thereafter contacted for follow-up input or to notify them when their comment/question will be discussed on the show.

Some call-in shows allow participants to submit their input via email. Then, the emails are screened by the staff of the show and presented (sometimes in edited form) during the show. Because the show may receive a large number of emails, only some of which may actually be read by the show's staff, return email responses to all participants are rare, and so email techniques of this type are not truly interactive either. Also, the extensive use of human staff to manage all facets of processing participant input makes the show more cumbersome to run, and the cumbersome handling of participant input can reduce the show's attractiveness to viewers. Furthermore, this lack of true interaction usually requires the participant to constantly check the television or radio show to determine if or when the participant's question/comment will be addressed during the show. If the participant decides to perform other activities and does not "stay tuned" to the show, then participant risks missing the show's segment that may be related to the participant's question/comment or may otherwise be of potential interest to the participant.

Accordingly, improvements are needed with regards to management of participant input for shows.

SUMMARY OF THE INVENTION

The above-described problems relating to shows are addressed by the present invention. The present invention comprises a system and method to manage participant input for an interactive show. In accordance with an embodiment of the invention, participant input for an interactive show, such as input submitted by the show's viewers or listeners, is stored in a server. The participant input stored in the server is processed to sort, identify, classify, or select submissions that may be appropriate to address during the interactive show or during other times, or to otherwise determine a relationship of the participant input relative to the show. While the participant input is being processed, the participant who sent the participant input need not be kept on hold or otherwise have to keep the line of communication open. Instead, the communication between the participant and the interactive show can be terminated. An alert can be subsequently sent to the participant if or when the participant's submission is to be addressed in the interactive show. An aspect of the invention provides a method to receive participant input for a show and to subsequently disconnect a communication with a participant that submitted the participant input. The participant input is held in a storage location. The method further includes automatically processing the stored participant input to determine a relationship of the participant input to the show. Based on the determined relationship, the method alerts the participant that submitted the participant input if the participant input is selected for the show.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of a method and system to manage participant input for an interactive show are described herein. In the following description, some specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention provides a system and method to manage participant input for an interactive show. Participant input can include, but is not limited to, items such as questions, comments, requests for information or other requests, or other such submissions that can be sent by a participant to an interactive show for processing and feedback. In accordance with an embodiment of the invention, participant input (whether solicited or submitted independently) is received and stored in a server. Thereafter, software or other techniques are used to process the participant input stored in the server, in order to determine a relationship of the participant input to the interactive show, which can include sorting, identifying, classifying, or selecting submissions that may be appropriate to address during the interactive show or during other times.

While the participant input is being processed, the participant who sent the submission need not be kept on hold, and instead, the participant can terminate the communication with the interactive show, with an alert capable of being subsequently sent to the participant if the participant's submission is to be addressed in the interactive show. This allows the participant to do other activities, instead of constantly monitoring a television channel or radio station, and allows the participant to be notified to "tune in" to the interactive show so that the participant can further interact with the interactive show when the participant's submission is addressed.

Figure 1:
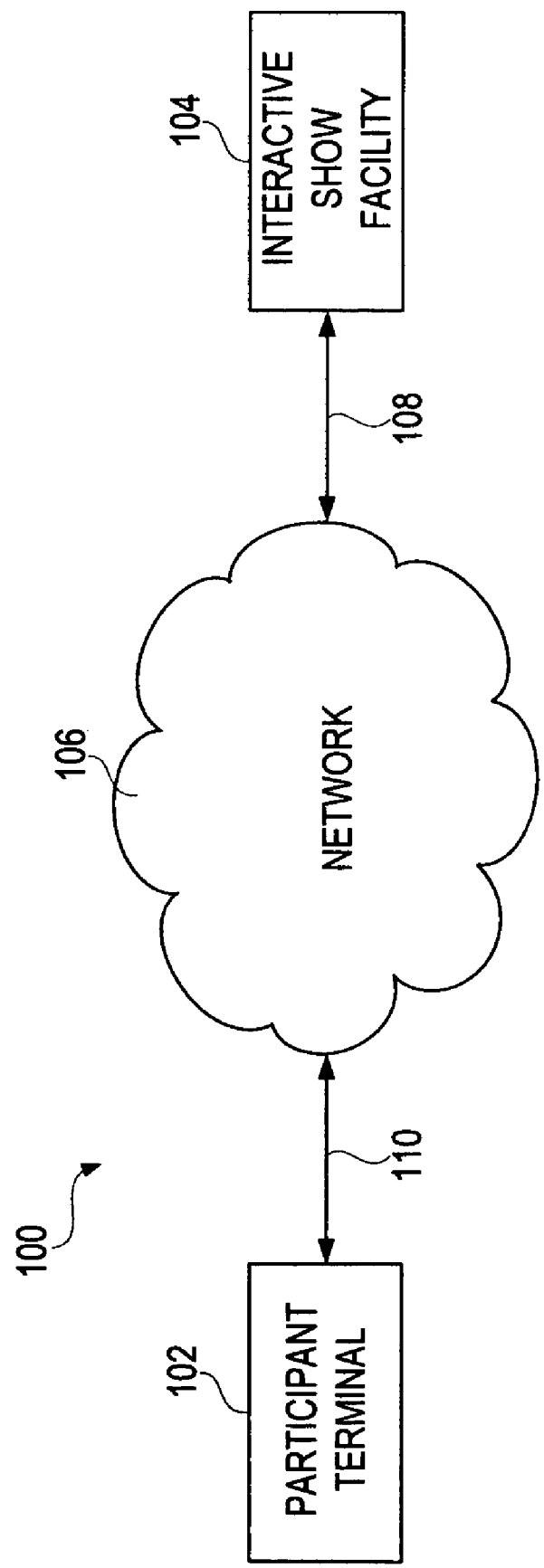
FIG. 1 shows a system to provide interactive shows in accordance with an embodiment of the invention.

Referring first to FIG. 1, shown generally at 100 is a system to provide interactive shows in accordance with an embodiment of the invention. The system 100 includes one or more participant terminals 102 and an interactive show portion or facility 104. The participant terminal 102 and the interactive show facility 104 can communicate with each other through a network 106, via communication links 108 and 110. The communication links 108 and 110 can comprise hardwire links (e.g., coaxial cable, fiber optic, twisted-pair, etc.), wireless links (e.g., radio frequency, optical, satellite, etc.), or other conventional type of communication media or combination thereof.

The participant terminal 102 can comprise any type of suitable transmission/reception device that has connectivity capabilities with the network 106. Examples of the participant terminal 102 include, but are not limited to, a personal computer (PC), a television having a set top box for Internet communication, an interactive television, a conventional television, a web camera ("web cam"), a radio/stereo, a telephone, a pager, a mobile wireless device such as a cellular telephone or a personal digital assistant (PDA) device, a facsimile machine, a cable modem or telephone modem device, or other devices or any combination/connection thereof. In one embodiment, the participant terminal 102 can include a public or private kiosk, located in a shopping mall or in an airport terminal for example, which participants can use for viewing/listening/reading of an interactive show and which can be used for submitting input to the interactive show. In short, the participant terminal 102 can include any suitable type of device or combination of devices that allows a participant to view/read/listen to an interactive show, prepare and submit submissions to the interactive show, capture the participant's voice and image, or receive feedback from the interactive show.

The network 106 can comprise any type or combination of communication network Examples of the network 106 include the Internet television networks (including cable, aerial, and satellite television networks), local area networks (LAN), radio broadcast networks, interactive video casting networks or interactive television networks, telephone networks1 such as the Public Switched Telephone Network (PSTN), or other types of networks or combinations thereof capable to provide interactive show broadcasts to one or more participant terminals 102 and to receive participant input from the participant terminal(s) 102. Examples of interactive video casting systems That can be used to provide interactive shows and to send/receive participant input are described in pending U.S. patent application Ser. No. 09/736,952, entitled "METHOD AND SYSTEM TO PROVIDE DEALS AND PROMOTIONS VIA AN INTERACTIVE VIDEO CASTING SYSTEM," filed Dec. 13, 2000, which is assigned to the same assignee as the present application and which is incorporated herein by reference. It is to be appreciated that the interactive video casting systems described in this pending application are merely illustrative of possible systems or networks that can implement an embodiment of the invention, and that other networks or systems may be used as well.

The interactive show facility 104, in one embodiment, can comprise a studio from which a television program or a radio program is broadcast or taped. The interactive show broadcast from the interactive show facility 104 can also include "web casts," live feeds, or other types of communications that are not necessarily confined to a "studio" environment. Via one or more communication links 108, the interactive show can be transmitted to the network 106 for eventual reception by the participant terminals 102. In accordance with one embodiment of the invention, the transmission of programs from the interactive show facility 104 to the participant terminals 102 can utilize conventional broadcasting techniques.

Figure 2:
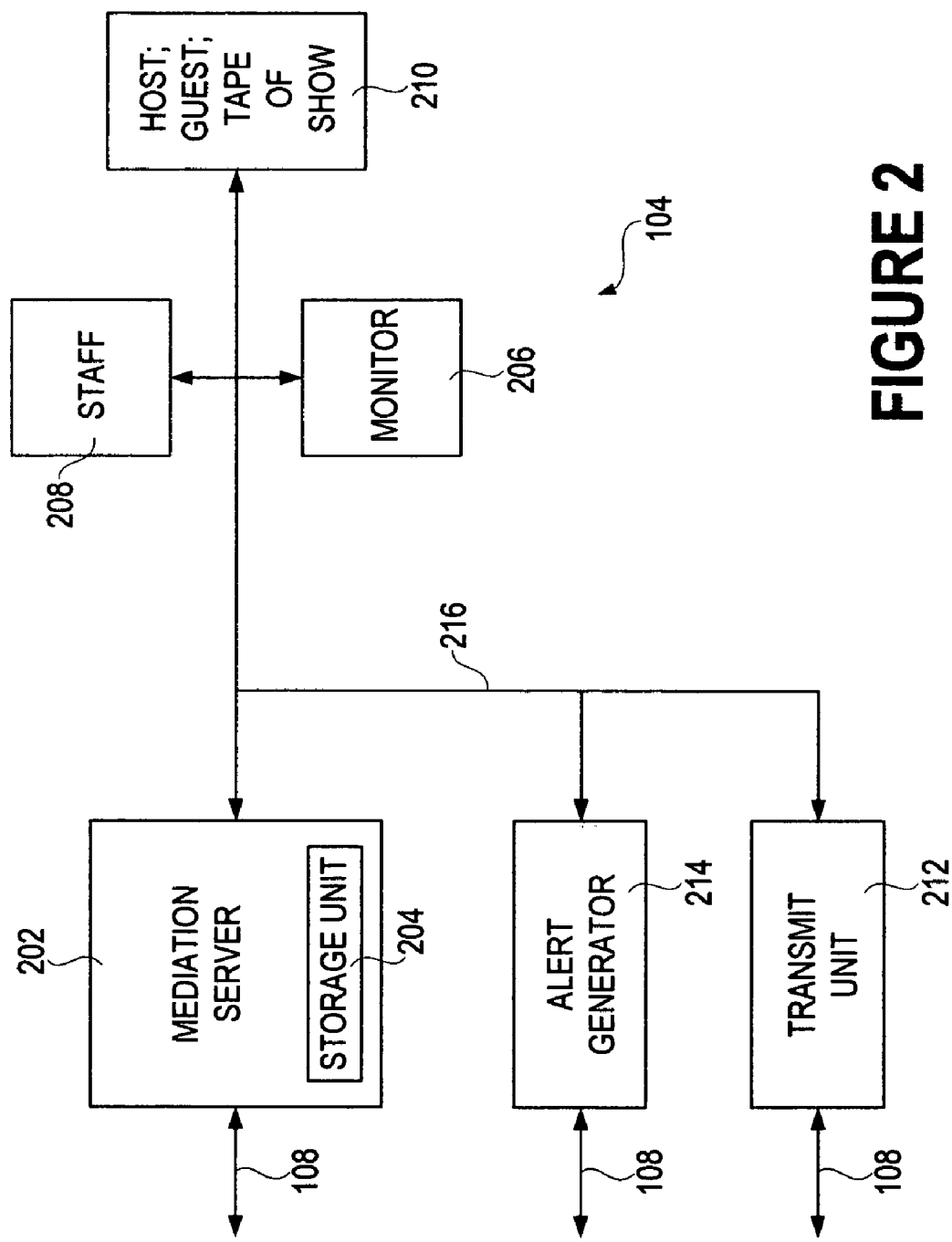
FIG. 2 is a block diagram showing an embodiment of an interactive show portion of the system of FIG. 1 in greater detail.

An embodiment of the interactive show facility 104 is shown in greater detail in FIG. 2. In one embodiment, all of the components of the interactive show facility 104 can be located in close proximity to the confines of the studio. In another embodiment, some of the components of the interactive show facility 104 can be located remotely from the studio, including location of some components within the network 106 itself.

The interactive show facility 104 includes a mediation server 202 that is coupleable to the communication link 108 to receive submissions sent from participant terminals 102 via the network 106. The mediation server 202 includes or is coupled to a storage unit 204. The storage unit 204 can comprise any type of suitable machine-readable storage medium and its associated hardware, including but not limited to, compact disks (CDs), digital versatile disks (DVDs), magnetic tape drives, video cassette recorder/players, hard disks, floppy disks, digital or personal video recorders (DVRs or PVRS), etc.

In accordance with an embodiment of the invention, the storage unit 204 is capable of collecting or storing participant input for an interactive show. Such participant input can be in the form of voice-only messages (such as voicemail), video-only, video with audio, JPEGs, MPEGs, facsimile messages, emails, an animated or still avatar or other representation accompanied by voice audio, character string messages sent via wireless devices, or other types or formats of messages or information. The storage unit 204 or other machine-readable medium can also have stored thereon software or other machine-readable instructions to process the participant input received by the mediation server 202. Details of this processing of participant input to the interactive show will be described in further detail below.

As described herein, it is possible to receive participant input at the interactive show facility 104 that have many different types of formats, including voicemail, email, video, streaming media, web page transmission, etc. In accordance with an embodiment of the invention, these different submission formats can be received by corresponding devices in the interactive show facility 104 that are compatible with the particular format of the received submission. Then, these devices can convert the various formats into one or more other formats (such as an electronic file) that are compatible for storage in the storage unit 204. Alternatively or in addition, the participant input having different formats can be stored in a storage medium that is suitable for storing that format. The mediation server 202 can subsequently interface with these storage media, using software and hardware for instance, to identify, sort, classify, etc. the contents of each individual storage medium.

The mediation server 202 may be coupled to a monitor 206. The monitor 206 can perform as a control unit that is usable by human staff 208 to perform last-stage screening of participant input stored in the mediation server 202, to perform other processing in conjunction with the mediation server 202, or to perform other functions to control operation of components of the interactive show facility 104. That is, for instance, the staff 208 can use the monitor 206 to perform selection, editing, sequencing, etc. to make the participant input(s) more appropriate for the particular segment of the interactive show. As an example, the monitor 206 can be a PC that the staff 208 can use to add captions to video submissions or to edit or control the content of email messages. The monitor 206 can include a display screen, for example, that the staff 208 can use to verify that a participant shown in a video submission is visually presentable for an interactive television show. The monitor 206 can also include an audio device, so that the staff 208 can screen the audio portion of a submission before the submission is passed on to the interactive show.

Once a particular participant submission is approved by the staff 208, the submission is passed on to an interactive show production 210 (e.g., the submission is passed on to the host of the interactive show, to a guest, to be taped along with the interactive show, etc.). The interactive show facility 104 includes a transmit unit 212 to transmit the interactive show itself to the network 106 for eventual broadcast. Components of the interactive show facility 104 can be communicatively coupled together by one or more buses 216 or other communication media.

The interactive show facility 104 can include or be coupled to an alert generator 214 in one embodiment. The alert generator 214 can send electronic alerts (such as emails, facsimiles, voicemails, pages, screen alerts, or other visual or audible cues) to the participant terminal 102 to notify participants that their submissions are to be addressed in the interactive show. Thus, the participants need not "stay tuned" to the interactive show, but instead can be permitted to disconnect and perform other activities until they are alerted by the alert generator 214. In one embodiment, the alert generator 214 can be explicitly directed by the staff 208 to send an alert. In another embodiment, the alert generator 214 can be more automated such that, for example, an alert can be automatically sent once the staff 208 schedules air time of a particular submission via use of the monitor 206. In yet another embodiment, the alert generator 214 can comprise a human operator that actually contacts the participant. It is to be appreciated that in one embodiment, the alert generator 214 need not necessarily send alerts and can be capable to send other types of informative data to the participant terminal(s) 102.

As evident by the embodiment of the interactive show facility 104 illustrated in FIG. 2, the amount of "tied up" lines can be significantly reduced, thereby resulting in reduced resource requirements. That is, submissions to the mediation server 202 can use a minimum amount of communication links 108, since the link(s) 108 are reused often as submissions are received and communications are terminated (as opposed to keeping the links 108 tied up by keeping callers/participants on hold). Further, different types of links 108 can be used to optimize the communication exchange so that no particular communication link 108 is overused. For instance, submissions may be received via email, while alerts can be sent via wireless telephone.

Figure 3:
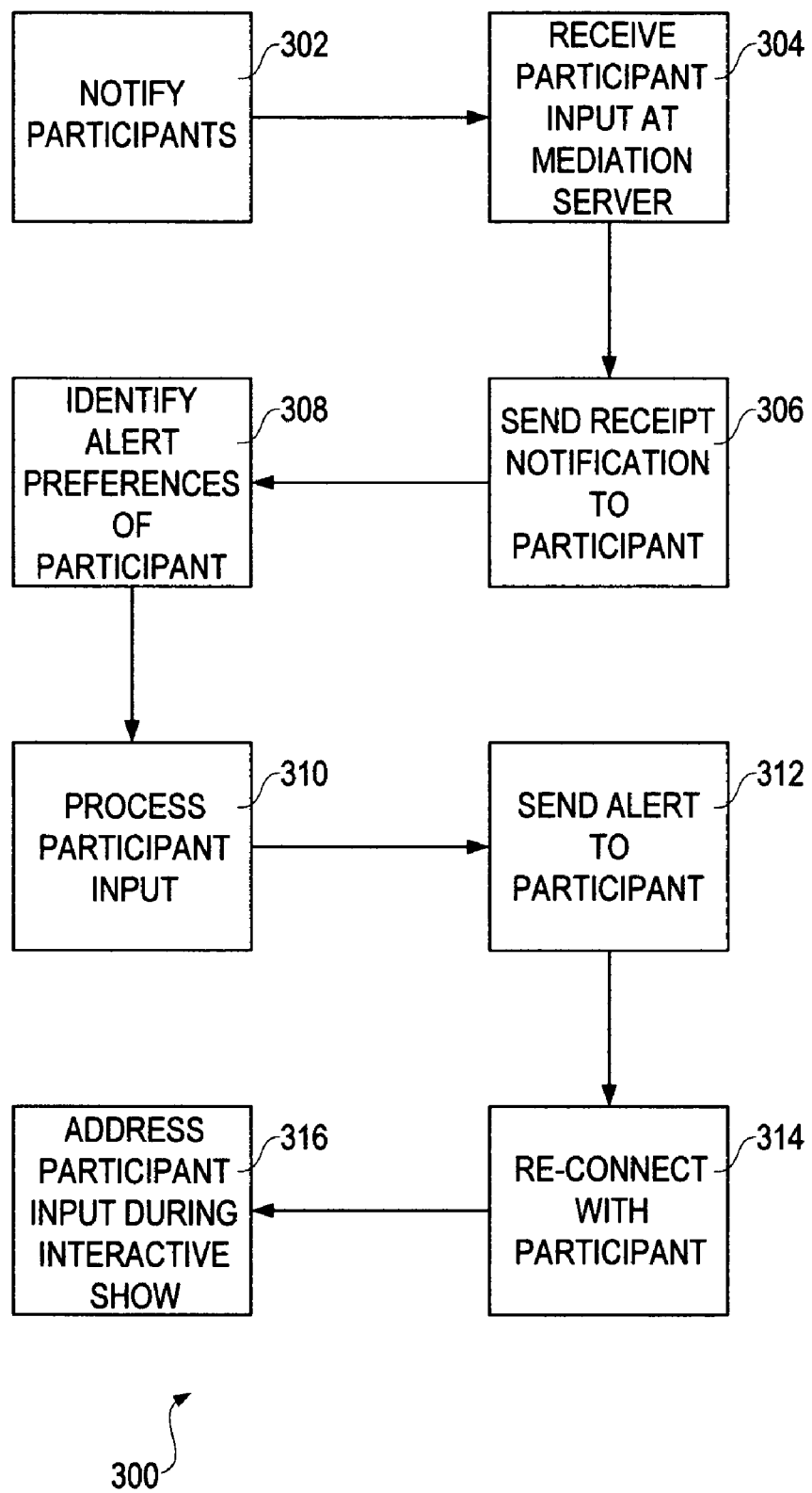
FIG. 3 is a flow diagram illustrating operation of the interactive show portion of FIG. 2 to manage participant input in accordance with an embodiment of the invention.

FIG. 3 is a flow diagram 300 illustrating an example operation of the interactive show facility 104 in accordance with an embodiment of the invention. Some components of the flow diagram 300 may be embodied in software or other machine-readable instructions stored in one or more storage media, such as in the storage unit 204 of the mediation server 202.

Beginning at a block 302, potential participants are notified of the availability of an interactive show to receive participant input. Such notification can include providing an email address or telephone number associated with the interactive show, and can occur during a broadcast of the interactive show, such as a screen graphic or a human host's invitation to participants to submit input. The notification may also occur during other times, such as during a commercial break or during a preview/commercial of upcoming shows. The notification can take on many different forms, in addition or alternative to the screen graphic or visual cue. Email, voicemail, facsimile, page, etc. may be used for participants who are on general or specific mailing lists. Notifications can be posted on the interactive show's web site in an embodiment. In another embodiment, regular post office mail or live telephone calls by the staff 208 to participants can be conducted.

Alternatively or in addition, the interactive show may permit submission of participant input on a continuous basis, without necessarily having to prompt/notify the participant at the block 302. Thus, participants can submit input independently and not have to do so in response to an invitation from the interactive show.

Next at a block 304, participant input is received at the mediation server 202. As described above, the participant can use any type of suitable participant terminal 102 to create and send submissions. The creation of text, audio, video, etc. messages/submissions can include any appropriate synchronization of voice and video images, or voice and avatar images, for example. Participants may also edit their submissions to their liking, and then send the submissions to the interactive show after the participant is satisfied with the submissions' form and content. In accordance with one embodiment of the invention, a web site may be provided by the interactive show that has a web page where participants can create and submit their input. The web site may be provided with capability to upload video clips, avatars, audio clips, etc. from the participant as part of the participant's submission.

The mediation server 202 can be configured to optimize resource allocation and/or to otherwise improve efficiency as participant input is received at the block 304. For instance, the mediation server 202 might be configured such that only a certain number of emails, for a particular segment of an interactive show, is accepted for a pre-defined period of time. The staff 208 can use software to pre-define categories, subject matter, settings, or many other different profiles for submissions and/or their corresponding interactive show. That is, as an example, the staff 208 can pre-define particular subject matters for an interactive show and then have the mediation server 202 do an initial level of sorting/screening as participant submissions are received at the block 304, including having the mediation server 202 direct the submission(s) for storage under each pre-defined subject matter for later identification and processing.

Next at a block 306, notification may be sent to participants to inform the participants that their submissions were received. Such receipt notification can use the formats or medium described above with regards to the notifications sent at the block 302. The notifications sent at the block 306 may be sent from the mediation server 202 or from other component of the interactive show facility 104 as automatically generated messages in one embodiment, or generated in less-automated form according to another embodiment.

The receipt notifications sent at the block 306 can include, or be followed by in a block 308, inquiries to the participant requesting the participants to identify whether, when, or how the participants wish to receive alerts if their submissions are selected for the interactive show. The participants can then respond with the appropriate information, such as a facsimile number, email address, pager number, telephone number etc., and the submitted alert information is subsequently stored by the mediation server 202 in the storage unit 204. Alternatively or in addition, the participant may provide this alert information when preparing submission for sending to the mediation server at the block 304.

Next at a block 310, the participant input stored by the mediation server 202 in the storage unit 204 is processed to sort and select submissions for the interactive show. Such processing can be performed to determine a relationship of the participant input to the show and can be performed automatically by software of the mediation server 202, by the staff 208 working in conjunction with the monitor 206 and the software of the mediation server 202, or via use of other tools/techniques, according to various embodiments. Illustrative and non-exhaustive examples of this processing are described below.

The mediation server 202 or other component can use keyword search software, in one embodiment, to search a text of an email, for example, so that the email can be identified to a specific category or segment of a particular interactive show. Thereafter, the search results can be provided to the monitor 206 for further review/processing by the staff 208. Alternatively or in addition, the staff 208 can use the keyword search software via the monitor 206 to perform their own sorting classification, identification, or selection. Any suitable criteria can be used by these processing techniques to process the submissions, in addition to or instead of keywords, such as time of submission, type of submission (e.g., video, email, voicemail, etc), length of submission, etc.

In one embodiment, voice recognition or speech processing software can be used to process live calls or voicemails. The voice recognition software can be coupled to or be included in the mediation server 202, such that electronic text that represents the original audio can be stored for further processing (e.g., read by the staff 208 or subjected to keyword searching). In an embodiment, audio that accompanies a video submission can be extracted and converted by voice recognition software into electronic text. Thereafter, the electronic text can be processed to correlate the corresponding video clip to a particular category, criteria, or other relationship to the interactive show. Alternatively or in addition, the staff 208 can review (e.g., view and listen to) the video on the monitor 206 and perform their own processing.

Thus, by providing the mediation server 202 to store participant input and by providing software or other tools to process the input, the amount of work that the staff 208 needs to perform can be reduced. It is to be appreciated that the processing described above are merely illustrative of techniques that can be used, and that these techniques can be combined or that other techniques can be implemented.

If a particular participant's submission is ultimately selected by the staff 208 based on a determination of the relationship of the participant information to the interactive show, then an alert can be sent to the participant at a block 312, via use of the alert generator 214, for example. The alert can notify the participant that the submission, or a submission of another participant that may be of interest, is scheduled to be broadcast, discussed, or otherwise acted upon by the interactive show. Such an alert may be done by email, voicemail, facsimile, page, screen alert, or other techniques. The alert, in an embodiment, may contain information, such as the time of broadcast, an identification of the radio or television channel, a description of the subject to be discussed, etc. The alert may also include information, such as whether follow-up from the participant will be taken. Thus, the individualized alert permits the participant to then tune in (or schedule recording) at those times that are convenient or of interest to the participant.

At a block 314, re-connection to the participant terminal 102 may be performed to obtain follow-up input from the participant, which may occur before, during, or after the interactive show. This can include connection of the participant terminal 102 to the interactive show facility 104 just before the scheduled air time, so that the participant can interact or be placed on the air during the interactive show. Such connection may be by email, instant messaging, web cam, telephone, etc. Subsequently during a specific segment of the interactive show, the participant's submission (or submissions of interest) is addressed at a block 316.

In conclusion, an embodiment of the invention provides a system and method to manage participant input for an interactive show. The participant input is received and stored in a mediation server. Thereafter, software or other techniques processes the participant input stored in the server 202 to sort, identify, classify, or select submissions that may be appropriate to address during the interactive show or during other times. While the participant input is being processed, the participant who sent the submission need not be kept on hold, and instead, the participant can terminate the communication with the interactive show. An alert can be subsequently sent to the participant if or when the participant's submission is to be addressed in the interactive show.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For example, while embodiments have been described generally herein in the context of a submission of a participant in response to an interactive show, it is to be appreciated that in another embodiment, the participant need not necessarily be responding to anything. As an example, a participant may wish to be notified when a segment on salmon fishing is broadcasted by a local or national fishing show, or when the show is to respond to another participant's submission related to salmon fishing. In such a situation, the participant can submit a request to the show to be notified when salmon fishing subjects are to be discussed, and then receive an alert if/when the subject is scheduled. The participant may then be allowed to submit further input, or can simply tune in and view the segment.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for screening participant comments or questions for content in an interactive discussion show, comprising:
   for each participant desiring to provide a comment or question to be discussed in the show;
      receiving the participant question or comment and subsequently disconnecting a communication link with the participant before the question or comment is discussed to allow the communication link to be reused by other participants;
      storing the participant comment or question in a storage location;
      automatically processing the stored participant comment or question to determine a relationship of the participant comment or question to the show;
      based on the determined relationship, alerting the participant if the participant comment or question is selected for discussion in the show; and
      reconnecting the communication link with the participant to allow the participant to interactively discuss the participant comment or question in the show.

2. The method of claim 1, further comprising prior to receiving the participant comment or question for the show, notifying the participant of an availability of the show to receive the participant comment or question.

3. The method of claim 1 wherein the show comprises a television show or a radio show.

4. The method of claim 1, further comprising identifying an alert preference of the participant.

5. The method of claim 1 wherein alerting the participant who submitted the participant comment or question includes alerting the participant who subject matter related to another participant's comment or question is to be addressed in the show.

6. The method of claim 1 wherein automatically processing the stored participant comment or question to determine the relationship of the participant comment or question to the show includes:
   using a speech recognition technique to convert an audio format of the participant comment or question into a text format; and
   performing a keyword search on the text format to classify the participant comment or question relative to the show.

7. The method of claim 1 wherein a human operator selects the participant comment or question for the show.

8. The method of claim 1 wherein the participant comment or question is receivable via a communication medium different from a communication medium usable to alert the participant.

9. The method of claim 1 wherein alerting the participant is capable of being done via one of a telephone call, voicemail, facsimile, email, instant message, screen alert, or page.

10. The method of claim 1 wherein the participant comment or question is capable of being received via one of a telephone call, voicemail, facsimile, email, instant message, transmission from a web page, page, video transmission, avatar transmission, cable modem transmission, interactive video casting transmission, or wireless transmission.

11. An article of manufacture, comprising:
   a machine-readable medium having stored thereon instructions to
      collect participant comment or question submitted for a show, wherein a communication link with a participant who submitted the participant comment or question is disconnected subsequent to submission of the participant comment or question before the comment or question is discussed to allow the communication link to be reused by other participants;
      process the stored participant comment or question to determine relevance of the participant comment or question to the show;
      based on a determination of relevance, alert the participant who submitted the participant comment or question if the participant comment or question is selected for discussion in the show; and
      reconnecting the communication link with the participant to allow the participant to interactively discuss the participant comment or question in the show.

12. The article of manufacture of claim 11 wherein the machine-readable medium further includes instructions stored thereon to identify an alert preference of the participant.

13. The article of manufacture of claim 11 wherein the instructions to process the stored participant comment or question to determine the relationship of the participant comment or question to the show includes instructions to:
   apply speech recognition to convert an audio format of the participant comment or question into a text format; and
   perform a keyword search on the text format to classify the participant comment or question relative to the show.

14. The article of manufacture of claim 11 wherein the instructions to collect the participant comment or question submitted for the show includes instructions to correlate the participant comment or question according to predefined criteria.

15. A system for screening participant comment or question for content in an interactive discussion show, comprising:
   a server coupleable to a plurality of terminals to receive participant comment or question for a show from each of a plurality of participants desiring to provide comment or question, wherein a communication link with each participant who submitted the participant comment or question is disconnected subsequent to reception of the participant comment or question and before discussion thereof to allow the communication link to be reused by other participants;

a storage unit to store each the participant comment or question received by the server, the participant comment or question stored in the storage unit capable of being automatically processed to determine a relationship of the participant comment or question to the show; and an alert generator to generate and transmit an alert to a particular participant terminal if, based on the determined relationship, the participant comment or question received from that participant terminal is selected for discussion in the show;

wherein the server is further to reconnect the communication link to the participant whose comment or question was selected to allow the participant to interactively discuss the selected participant comment or question in the show.

16. The system of claim 15, further comprising an interactive video casting network coupleable to provide the show to the participant terminal and to provide the participant comment or question from the participant terminal to the server.

17. The system of claim 15, further comprising another storage unit having speech recognition software to convert an audio format of the participant comment or question into a text format, and having keyword search software to search the text format for a keyword to classify the participant comment or question relative to the show.

18. The system of claim 15, further comprising a monitor coupled to the storage unit to control processing of the participant comment or question stored in the storage unit and to control operation of the server.

19. The system of claim 15 wherein the server is capable to store the received participant comment or question information into the storage unit according to predefined criteria.

20. A method for content screening of participant comment or question in an interactive discussion show, comprising:

establishing communication with a participant to receive a participant comment or question using a first communication medium;

disconnecting communication with the participant after receiving the participant comment or question and before discussion thereof to allow communication to be established with other participants;

storing the participant comment or question in a storage location;

in response to the participant comment or question being selected for discussion in the show, alerting the participant who submitted the participant comment or question using a second communication medium, the second communication medium being different from the first communication medium; and reestablishing communication with, the participant to allow the participant to interactively discuss the participant comment or question in the show.

21. The method of claim 20, wherein second communication medium used to deliver the alert comprises an e-mail message.

* * * * *